Patented June 30, 1925.

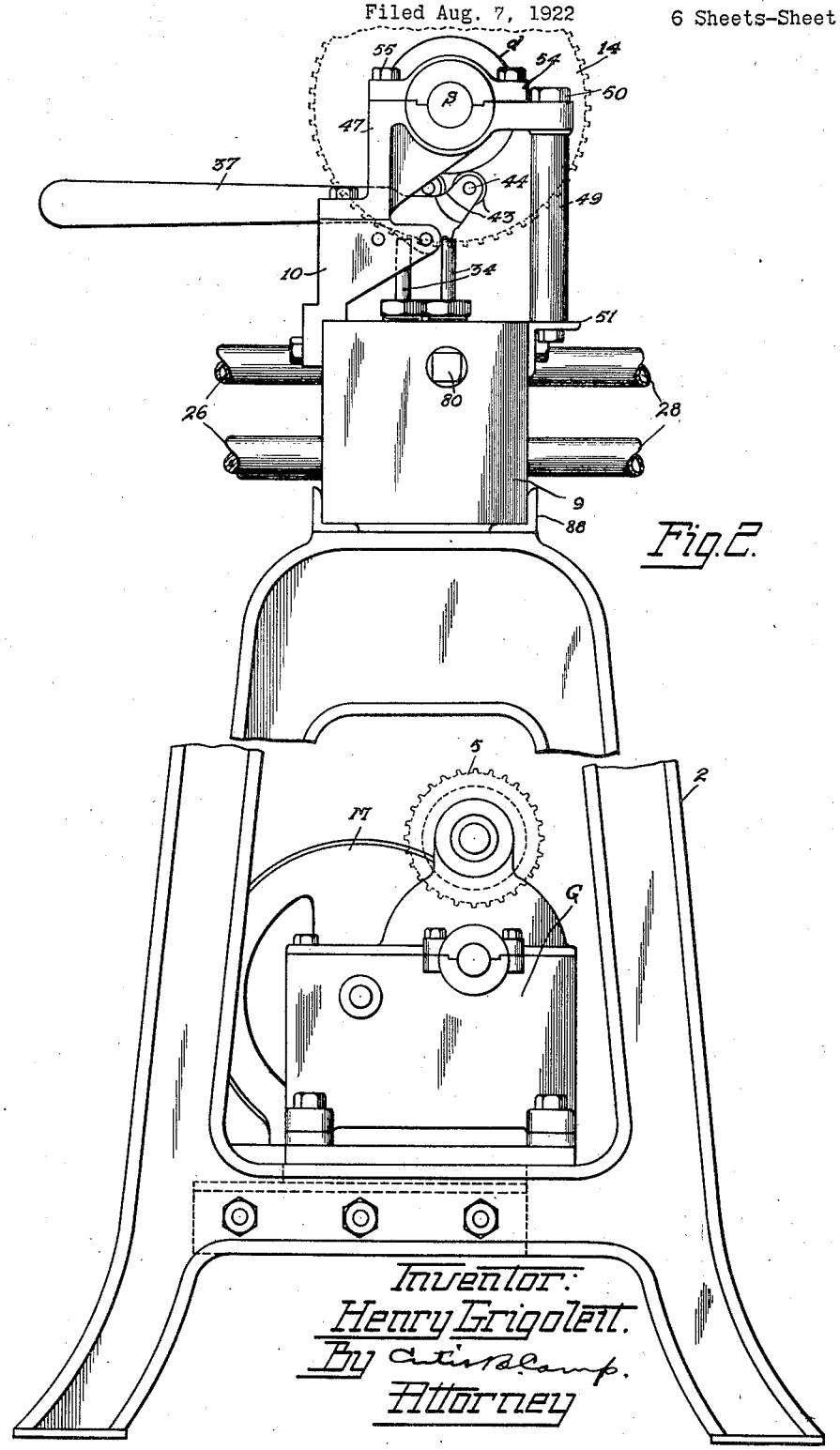

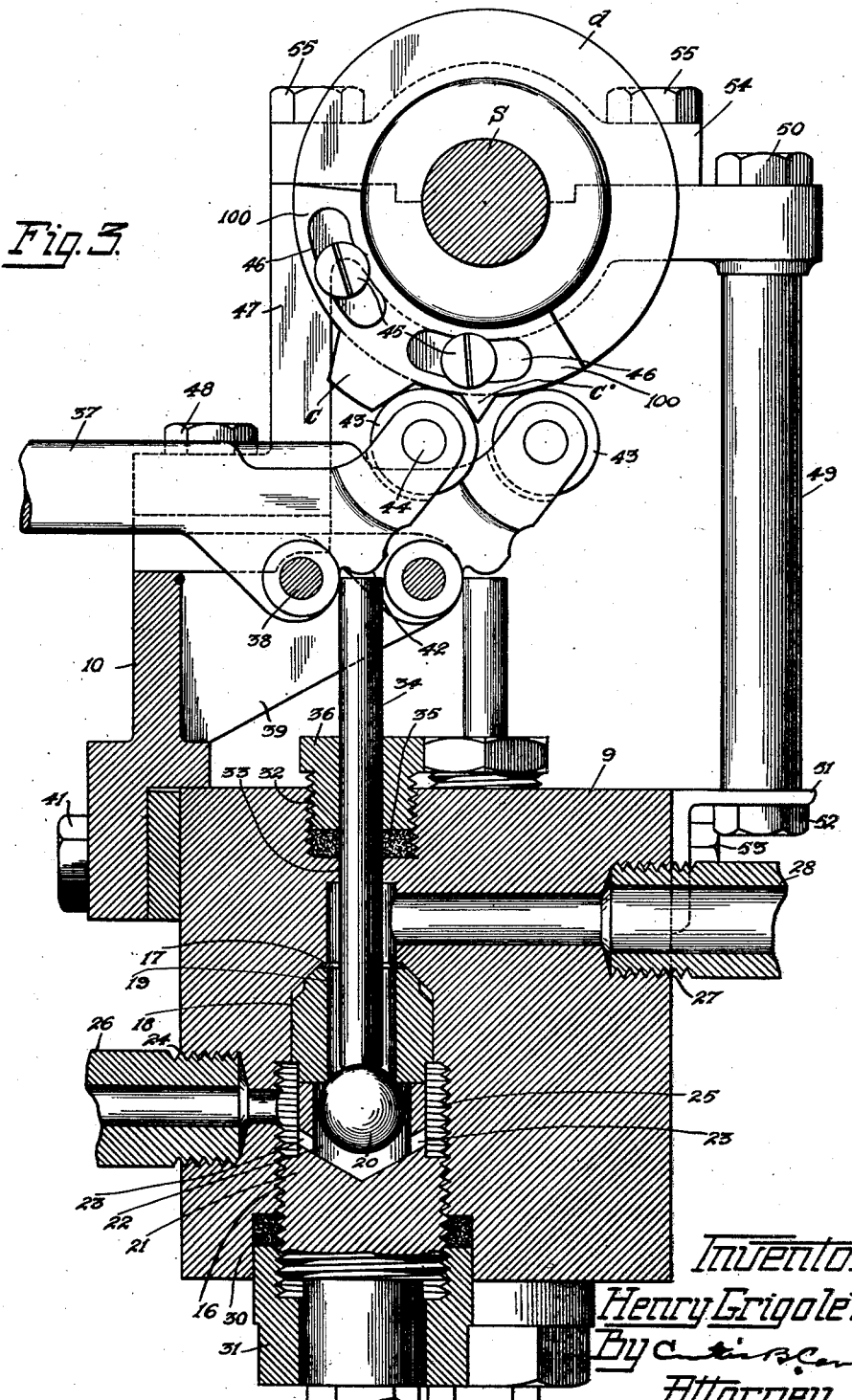

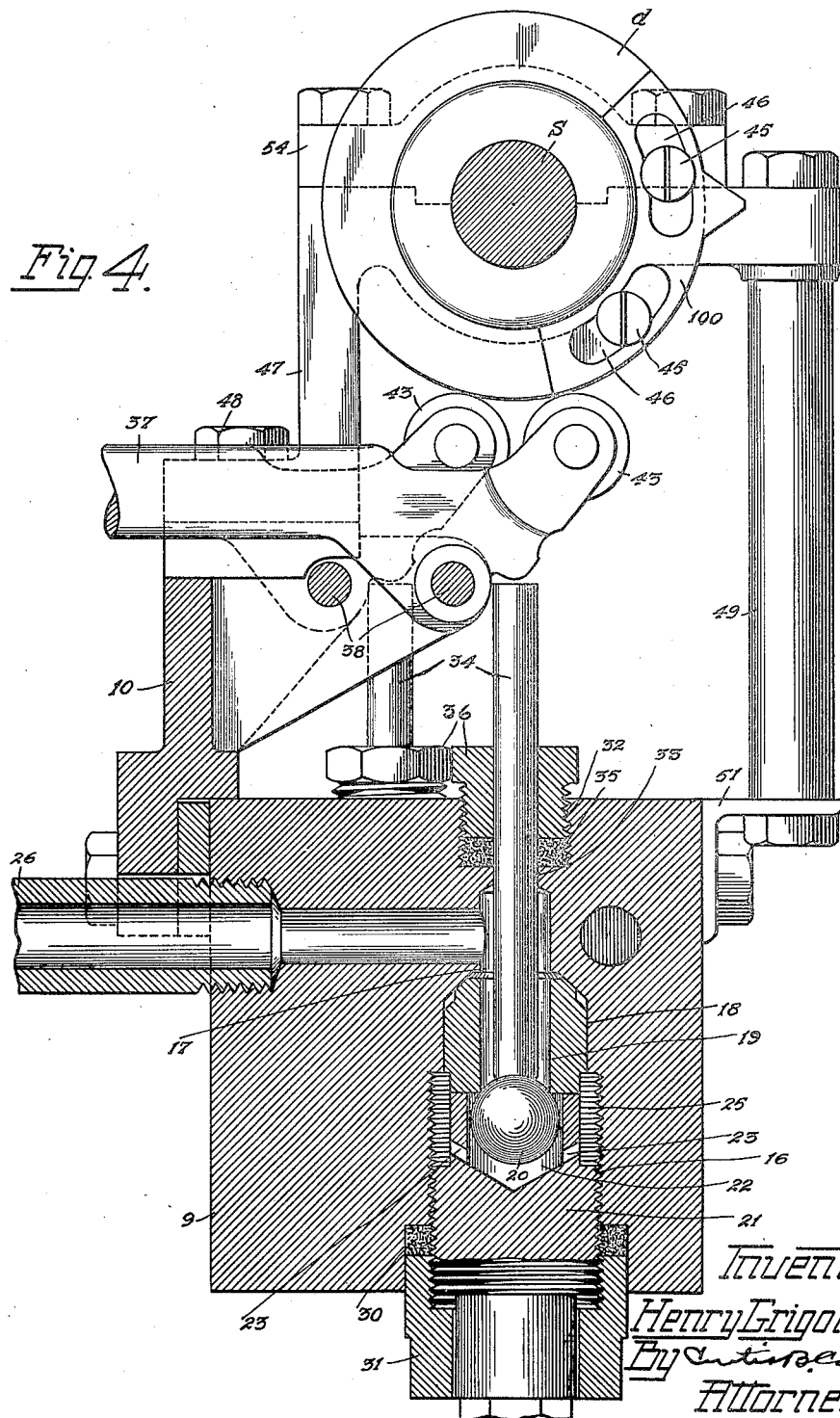

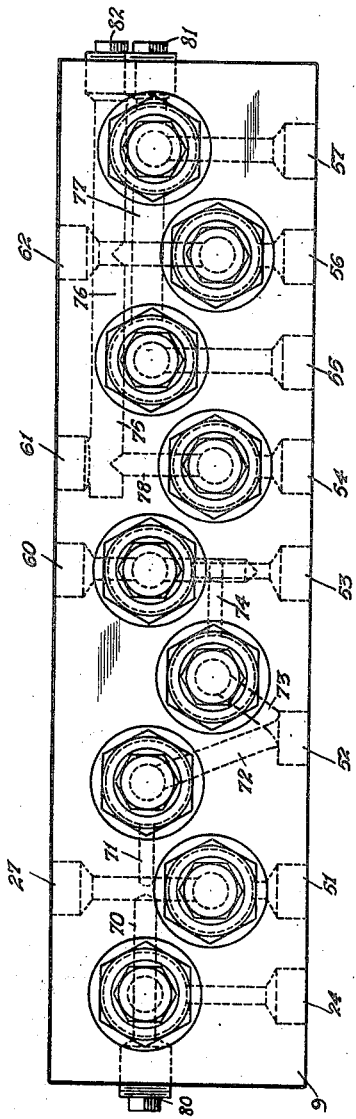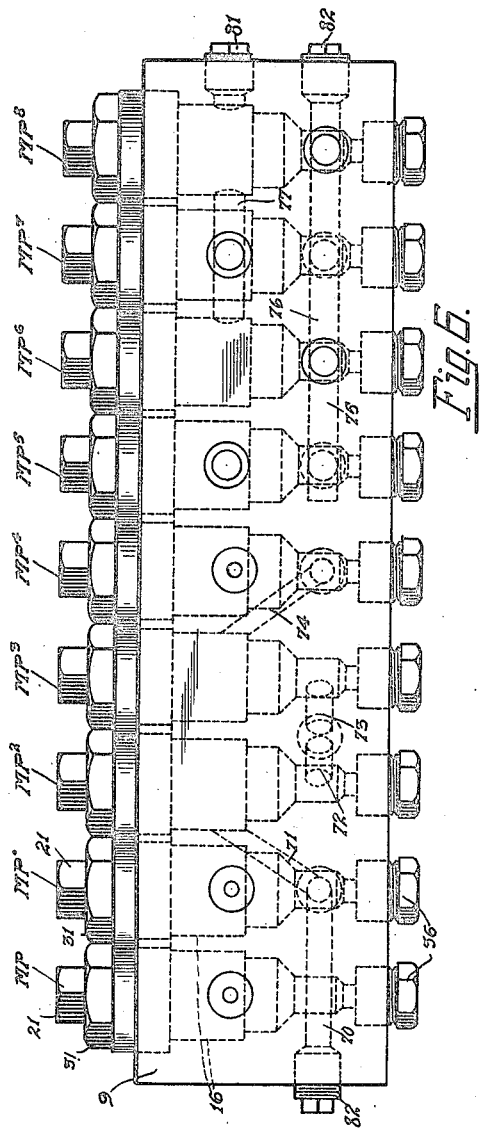

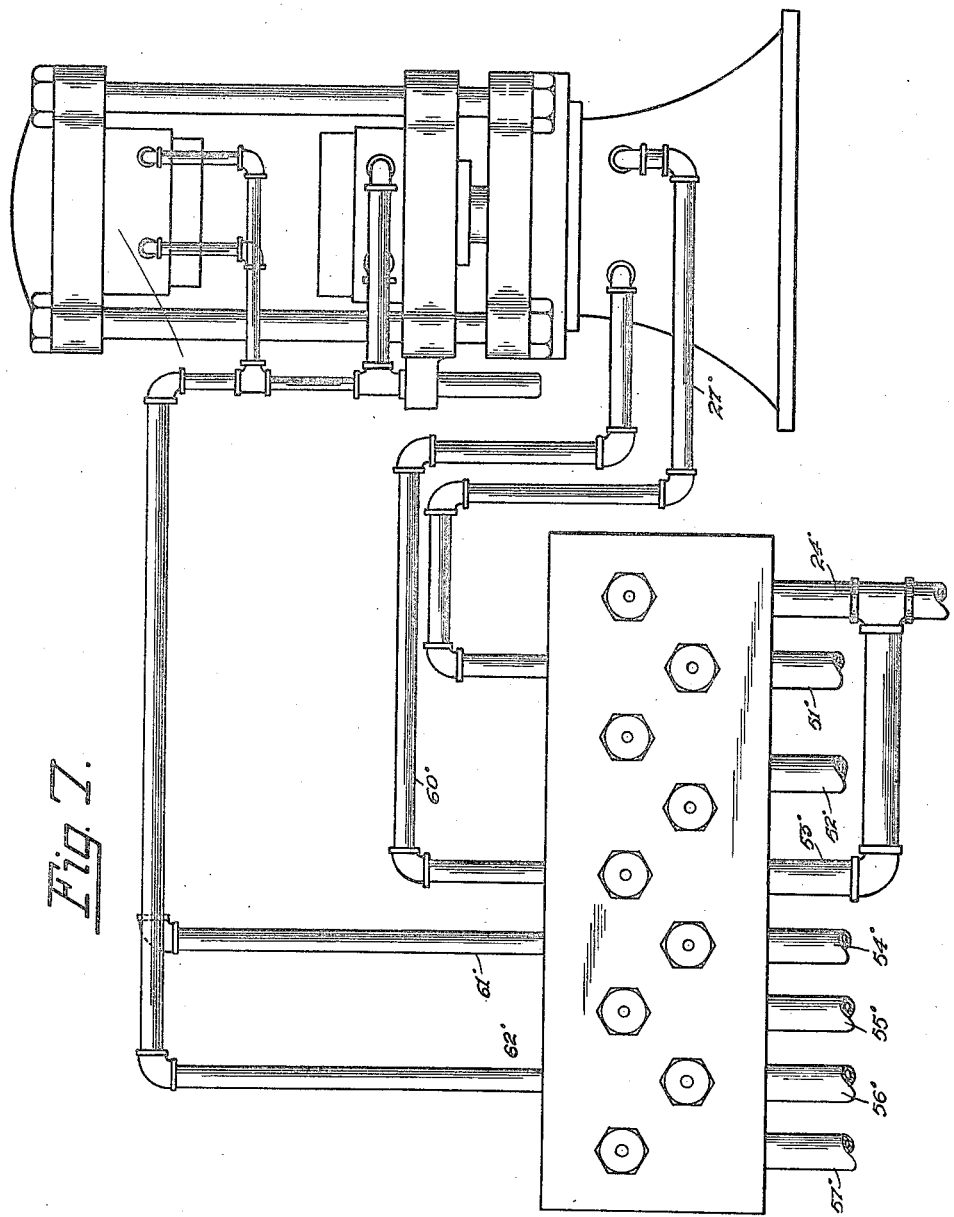

1,543,840

UNITED STATES PATENT OFFICE.

HENRY GRIGOLEIT, OF CHICAGO, ILLINOIS.

MULTIPLE-VALVE CONTROL.

Application filed August 7, 1922. Serial No. 580,379.

*To all whom it may concern:*

Be it known that I, HENRY GRIGOLEIT, a citizen of the United States of America, resident of Chicago, county of Cook, and State of Illinois, have invented certain new and useful Improvements in Multiple-Valve Controls, of which the following is a specification.

My invention relates to a multiple valve control device and has to be do more particularly with those which are used for controlling the flow of a substance under pressure, such as air, steam, water, etc., and for the sake of explanation I will describe my invention in connection with a press, such as is used for molding forms out of bakelite, redmanol, or any other similar composition which may be fused into a solid object by heat and pressure.

Hydraulic presses employed at the present time for converting and molding bakelite, or some other similar powder composition into a solid mass, are provided with forms or molds into which the powder composition is placed. The forms are then subjected to heat in the form of steam and are also placed under great pressure whereby the composition is fused into a solid mass. After the composition has been converted into a solid mass, the forms are liberated from heat and pressure, and then cooled by water circulating about the forms or molds, the water cooling the forms, which in turn cool the solid mass. To control the application of pressure, heat and water to the composition, multiple valves are provided which are associated with the form which receives the composition. These multiple valves are operated manually by an operator who attends the press. When the composition is placed in the form, the operator operates one of the multiple valves to turn on the pressure and then other multiple valves to turn on the steam to heat the composition under pressure for a definite time, say three minutes, after which time said valves are turned off to prevent the further application of heat and pressure. Now the operator turns on other multiple valves to permit water to flow about the form to cool the same, which in turn cools the composition which has been fused into a solid mass. After water has circulated about the form for a certain time, the valves are turned off and the solid mass is then removed from the form. The valves also control the closing and opening of the press, and the application of pressures of different values to the press to operate the same. The length of time in which the composition is under pressure and heat is very essential to the successful fusion of a marketable product. It often happens that the operator fails to turn off the valves at the proper time, or either he turns them off too soon, with the result that the composition is overbaked or not baked enough, which renders the product useless for commercial purposes since it is not of the quality required for the purposes to which it is to be adapted.

From the above it will be seen that it is necessary to have an operator at each press, and which operator must be very attentive and operate the multiple valves at the proper time in order to produce a marketable product.

In order to overcome the above mentioned objectionable feature, I have designed multiple valves and means for automatically operating the same, whereby all possibilities of overbaking or underbaking the composition are prevented. The means for operating my multiple valves comprises a motor driven shaft, which shaft has a number of discs secured thereto, there being a disc for each multiple valve, said discs having members provided with cam surfaces adjustably secured thereto and which cam surfaces engage and disengage apparatus associated directly with my multiple valves to cause said valves to open and close at the proper time, and for the required length of time to permit the application of pressure, heat and water to the composition. The cam surfaces are adjustable and may be adjusted to engage the multiple valves at any and for any length of time desired. The motor gearing is arranged to rotate the said shaft at such speed that the composition is completely converted into a solid mass and cooled during one complete revolution of the shaft carrying the cam discs. When the shaft has made a complete revolution, the circuit of the motor is automatically opened whereupon the motor stops operating which causes the rotatable shaft to automatically stop so that the multiple valves will not be operated a second time to affect the said solid mass. By having the multiple valves operated automatically one operator may take care of any number of presses, for after the press is once started its operation is automatically controlled so that it is not necessary for the operator to pay attention to the valves as was required in the old types of presses described above. I do not wish to limit myself to presses of the types described, as my invention may be used on various other molding and pressing machines in other arts.

Other features of my invention will be pointed out in the ensuing specification.

For a more complete understanding of my invention, reference may be had to the accompanying drawings, in which like reference characters in the several views denote like parts, and in which:

Fig. 2 is an elevational view showing an end view of Fig. 1;

Fig. 3 is a sectional view on line 3—3 of Fig. 1 showing one of my multiple valves and the apparatus for automatically operating the same;

Fig. 4 is a view similar to Fig. 3 but showing another one of my multiple valves and apparatus for operating the same.

Fig. 5 is a bottom view of the valve block;

Fig. 6 is a side view of Fig. 5 showing part of the apparatus in dotted lines; and Figure 7, diagrammatically illustrates the connecting pipes extending to my valve mechanism, and from my valve mechanism to the press X.

Figure 1:
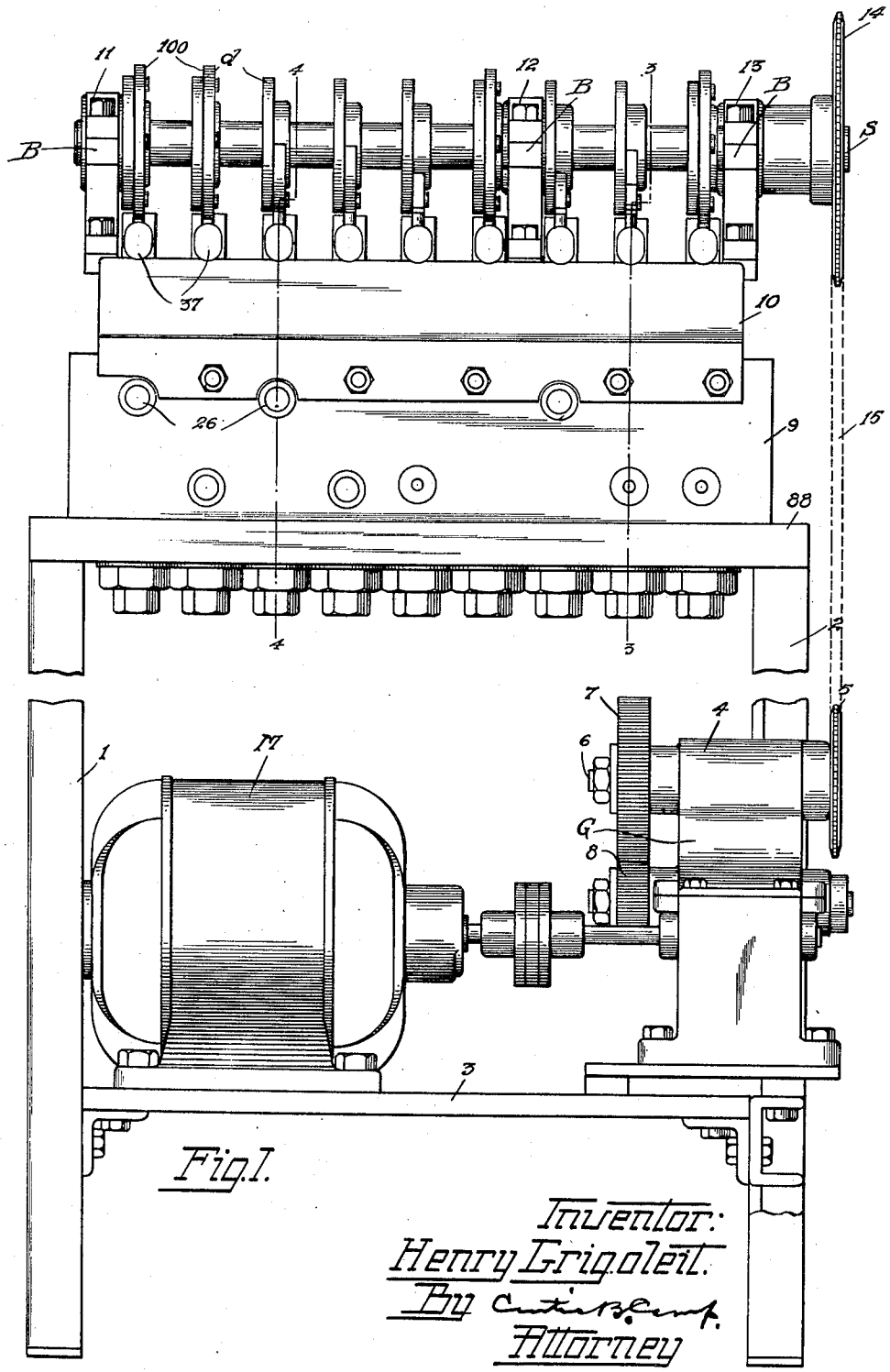
Fig. 1 is a side elevation of my invention showing the shaft carrying the discs and cam members in association with the multiple valves, and also showing the motor for driving said shaft.

Referring now to the drawings, M is an ordinary driving motor, and G is a train of gearing operatively associated therewith, both of which are supported between a pair of legs 1 and 2 by means of a mounting member 3 which is secured to said legs 1 and 2 by means of suitable machine screws. The gearing G is arranged in a suitable manner in a casing 4 for reducing the speed of the worm shaft to the required speed, whereby the sprocket wheel 5 secured to the shaft 6 is caused to rotate at a certain required speed through the medium of gear wheels 7 and 8. A rectangular valve box 9, in which are mounted the multiple valves, is supported upon the ends of the legs 1 and 2 by means of a member 88 which is suitably secured to said legs. A rotatable cam shaft S carrying discs $d$ to which are secured adjustable members having cam surfaces $c$ for operating the multiple valves, is provided and supported upon the valve box 9 by means of a mounting rack 10 and support bearing members 11, 12 and 13, there being a disc $d$ for each multiple valve. The shaft S has secured to its one end a sprocket wheel 14 which is operatively associated with the sprocket wheel 5 through the medium of a chain 15 whereby said cam shaft S is caused to rotate by the sprocket wheel 5 to bring the cam surfaces $c$ into engagement and disengagement with the multiple valves. The shaft S makes only one complete revolution during the time in which the powder composition is being converted into a solid mass, and when the said shaft S has completed a single revolution, the circuit of the motor M is opened which prevents said motor from further operating. I provide a cam and brush mechanism (not shown) for automatically controlling the circuit of the electric motor. A switch is also provided for starting the motor mechanism when the molds are filled with the molding compound.

Referring now particularly to Figures 2, 3 and 4, I will describe in detail the mechanism of one of my multiple valves and the means for automatically operating the same. The construction of my valve has had a great deal to do with making possible my valve control device. Prior valves have been faulty in that the substance under high pressure readily cuts away the valve and valve seat. But with my device the ball has an infinite number of seating positions and consequently always seats properly and wears for a long period of time. The valve block or box 9 is a solid piece of material, such as iron or the like, and is provided with suitable openings 16 arranged in staggered position relative to each other, said openings being adapted for receiving the multiple valves MP, MP', MP$^2$, MP$^3$, MP$^4$, MP$^5$, MP$^6$, MP$^7$, MP$^8$ (as fully illustrated in Figures 5 and 6). The opening 16 is reduced to provide a shoulder or collar 17. It is understood that any number of valves and controlling cams may be provided that is necessary for operating the press or moulding machine with which my control mechanism is to be associated. A valve seat 18 is provided which is of a size to permit its insertion into the opening 16 and has its one end suitably shaped to engage the shoulder 17, which limits the further insertion of the valve seat 18. The valve seat 18 is provided with a central opening 19, which opens into the reduced portion of the opening 16 and which has its opposite end arranged for receiving a valve ball 20 to prevent the flow of any substance through said opening 19. A member 21 is provided which has screw-threaded engagement with the opening 16 and which has its one end reduced in size and arranged to engage the valve seat 18, said end also being provided with an opening 22 of a size slightly larger than the diameter of the ball 20 which is adapted for receiving and retaining said ball 20 in association with the opening 19 in the valve seat 18.

The reduced end portion of the member 21 is provided with a plurality of slantingly bored openings 23. An opening 24 having a reduced portion is provided in the valve block 9, and opens into the channel 25 which is provided between the wall of the opening 16 and reduced end portion of the member 21. An intake cylindrical member 26 is provided which has screw-threaded engagement with the enlarged portion of the opening 24 and through which flows the substance under pressure, said substance then passing through the channel 25, openings 23 and into the opening 22 in the member 21. The ball 20 is forced into engagement with the valve seat 18 to prevent further flow of said substance, due to the pressure exerted upon the bottom surface of said ball 20 by said substance. By having the openings 23 bored in a slanting direction, the substance under pressure will always exert a pressure upon the bottom surface of the ball 20, whereby said ball will always tend to move upward to properly engage the valve seat 18. Another opening 27 having a reduced portion is provided in the valve block 9 which opens into the reduced portion of the opening 16, said opening being engaged by an outlet cylindrical member 28 which has screw-threaded engagement with the enlarged portion of said opening 27. The substance under pressure will escape through the opening 27 and member 28 when the ball 20 is caused to disengage the valve seat 18, which will be more clearly understood after reading the description regarding the operation of the valve. To prevent the escapement of the substance under pressure through the bottom of the valve, I provide a packing ring 30 of any suitable material, which fits snugly around the member 21, and which is forced upward and retained in an opening in the valve block 9 by means of a plug 31 which has screw-threaded engagement with member 21. An opening 32 which has a reduced portion 33 is provided in the top of the valve block 9, said reduced portion 33 opens into the reduced portion of the opening 16. A plunger rod 34 extends through the reduced portion of opening 33, and through the reduced portion of opening 16, into the opening 19 of valve seat 18, and into engagement with the valve ball 20, said plunger rod 34 having a tight fit in the opening 33, but not too tight a fit to prevent vertical movement of the said plunger rod. To prevent escapement of the substance under pressure, through the top of the valve, I provide a packing ring 35 which fits snugly around the plunger rod 34, and which is forced downward and retained in the opening 32 by means of a plug 36 which has screw-threaded engagement with the opening 32.

In order to automatically operate the plunger rod 34 to cause the valve ball 20 to disengage the valve seat 18 to permit the substance under pressure to flow through the valve, I provide a plunger operating member 37 which is pivotally supported on a rod 38 which rod 38 is secured to wings 39 integrally formed with the supporting rack 10 which is secured to the valve block 9 by means of suitable screws 41. The valves, of course, may be operated manually at any time by the operator moving the plunger operating handle or members 37 which directly control the valve operating rods. The plunger operating member 37 has a portion of its body 42 suitably shaped for engaging the top end of the plunger rod 34 to cause said plunger rod to move downward, and also has its one end provided with a slot in which a rotatable wheel or roller 43 is pivotally supported by means of a pivot pin 44 passing through said wheel and slot and into engagement with orifices in the end portion of said member 37. An arcuate shaped plate 100 provided with cam projections C and C' is operatively associated with the roller 43 and is secured to the disc $d$ by means of screws 45 which pass through suitable slots 46 in the member 100 and have screw-threaded engagement with suitable tapped orifices in its associated disc $d$. The slots 46 in the plate 100 permit the same to be adjusted so as to place its cam projections C and C' in proper relation with its associated roller 43 so that the valve with which the disc $d$, plate 100 and its cam projections C and C' as a whole are associated may be properly operated to perform its function in the sequence of operation of the multiple valve. The disc $d$ and its supported parts is secured to the shaft S in any suitable manner, as by means of a set screw. The shaft S and its disc $d$ as a whole is rotatably supported in the bearings B of which there are three. The bottom halves of the bearings B are integrally formed with the bearing brackets 47, and are secured to the supporting bracket 10 by means of the bolts 48. The bearing brackets 47 are also supported by means of supporting posts 49, and are also secured thereto by means of bolts 50, the said posts 49 being in turn secured to an angular bracket 51 by means of bolts 52 the said bracket 51 being secured to the valve block 9 by means of bolts 53. The bearing plates 54 are held in place by means of bolts 55, which have screw-threaded engagement with tapped orifices in the bearing bracket 47.

The other multiple valves and the means for automatically operating the same are constructed identical with that of the multiple valve just described, with the exception that the cam surfaces differ in size and the arrangement of the openings in the valve block through which the substance under pressure flows differ slightly from that just described above, but not sufficiently to make a description of each valve necessary.

The multiple valve just described operates in the following manner: When a switch is operated to close a circuit through the motor M, said motor operates to rotate the disc carrying shaft S through the medium of the gearing G, sprocket wheels 5 and 14 and chain 15. The shaft S rotating brings the enlarged cam surface C into engagement with the wheel 43 to move the same downward, said wheel moving downward brings the cam surface 42 of the plunger operating member 37 into engagement with the top of the plunger rod 34, thereby forcing said plunger rod 34 downward to cause the valve ball 20 to disengage the valve seat 18 to permit the substance under pressure to flow through the opening 19 and out through the opening 27 and outlet pipe 28 to the press to bring about a certain operation of the press. When the cam surface C has moved out of engagement with the wheel 43, the member 37 drops back to its normal position by gravity whereby the cam surface 42 disengages the plunger rod 34. The valve ball 20 now moves upward due to the pressure exerted upon its bottom surface by the substance under pressure, said ball 20 moving upward pushes the rod 34 upward until the valve ball 20 engages the valve seat 18 to prevent further flow of said substance through the opening 19. The motor continues to operate to rotate the shaft S to bring other cam surfaces into engagement and disengagement with plunger rods of other valves to open and close said valves to permit certain substances under pressure to flow to and from the press at the proper time to effect certain operations of the press. The shaft S continuing to operate brings the cam surface C' into engagement with the wheel 43, whereby the valve is again opened to bring about another desired operation of the press. When the wheel 43 comes into position between the cam surfaces C and C', the circuit of the motor M is automatically opened by any suitable means carried on the disc shaft S whereby the motor M stops to prevent further rotation of the shaft S. It is, of course, obvious that as many valves as desired may be operated at one time, and that the valves may be held opened or closed for as long periods of time as is desired. The valves can be operated in any desired sequence.

Referring now particularly to Figures 5 and 6, I will describe in detail the manner in which my multiple valves are arranged and associated in the valve block or box 9, and will also trace the travel of the different substances under pressure when passing through the valve block and multiple valves to the hydraulic press. The hydraulic press is not shown since its operation in molding various forms out of a composition is well known, and a description of the same is not deemed necessary.

The rectangular valve block 9 is provided with a plurality of staggered openings 16, which are engaged by the multiple valves MP, MP', MP$^2$, MP$^3$, MP$^4$, MP$^5$, MP$^6$, MP$^7$, MP$^8$ as was pointed out in the above description. Suitable openings 24, 51, 52, 53, 54, 55, 56 and 57 are provided in said valve block 9, and are engaged by cylindrical members 26, there being a member 26 for each of said openings for conducting the substance under pressure into or out of the valve block 9. Openings 27, 60, 61 and 62 are also provided in the valve block 9, and are adapted for receiving cylindrical members 28 which extend to the press, there being a member 28 for each of said openings. Ducts 70, 71, 72, 73, 74, 75, 76, 77 and 78 are provided for associating the different valves and for conducting the substance under pressure. The ducts 70, 75 and 77 have their outer openings closed by means of suitable plugs 80, 81 and 82, respectively, which have screw-threaded engagement with said outer openings to prevent the substance under pressure from flowing out through said openings.

When the disc carrying shaft S begins to rotate, a cam is moved into engagement with the plunger rod of the multiple valve MP' to open said valve, whereby water under low pressure is permitted to flow through the opening 51 in the valve block 9, through said valve MP', opening 27 and to the press to bring about a certain operation of the press. The valve MP$^2$ which is a drain valve for draining water from the press, is automatically closed when the valve MP' is opened, due to the pressure exerted upon the bottom surface of its valve ball by the water under low pressure also flowing through duct 71, which causes said ball to engage the valve seat to prevent the flow of water through said drain valve. After the cam has disengaged the plunger rod of the valve MP', a cam associated with the valve MP is moved into engagement with the plunger rod of said valve MP to cause the same to open whereby water at greater pressure is permitted to flow to the press via opening 24, through said valve MP, connecting duct 70 and opening 27 to the press. The drain valve MP$^2$ will remain closed at this time for the same reason given when valve MP' was opened.

Multiple valves MP$^7$ and MP$^8$ will now be opened by cams engaging their plunger rods to permit steam to circulate through the press to heat the composition which is under high pressure, the flow of the said steam being through opening 56, multiple valve MP$^7$, duct 75, opening 61, through the press, opening 62, duct 77, through the drain valve MP⁸ and out through opening 57. After the cams have disengaged the plunger rods of the multiple valves MP⁷ and MP⁸, said valves are closed to prevent further flow of steam. Multiple valves MP⁵ and MP⁶ are now opened by cams engaging their plunger rods whereby water is permitted to circulate through the press to cool the form containing the composition, said water flowing in through openings 54, through valve MP⁵, duct 78, opening 61, through the press back through the opening 62, duct 76, drain valve MP⁶ and out through the opening 55. When the cams have moved out of engagement with the plunger rods of the valves MP⁵ and MP⁶, said valves are automatically closed to prevent further flow of water. A cam is now brought into engagement with the plunger rod of the multiple valve MP⁴ to open the same to permit water under high pressure to flow to the press to bring about a certain operation of said press, the flow of water being through the opening 53, valve MP⁴, opening 60 to the press. The multiple drain valve MP³ is closed at this time but will be opened by a cam engaging its plunger rod when the multiple valve MP⁴ is again closed, to drain the water from the press which water will flow from the press through the drain valve MP³ and out through the duct 73 and opening 52. When the multiple valve MP⁴ is opened to permit water under high pressure to flow to the press, to operate said press, multiple valves MP and MP′ will be closed to prevent the further flow of water to the press through said valves MP and MP′, and the multiple drain valve MP² will be opened by a cam engaging its plunger rod to permit the water which flowed into the press through valves MP and MP′, to flow out of said press through the openings 27, duct 71, through the drain valve MP², duct 72 and opening 52, for if the water were not permitted to escape through the drain valve MP², there would be two directly opposed water pressures in the press, viz., that flowing through the valve MP⁴ and that which flowed through the valve MP or MP′, and the press would fail to operate. When the multiple valves MP and MP′ are open, the multiple valve MP⁴ and drain valve MP² will be closed, and multiple drain valve MP³ will be opened to drain the water from the press which flowed through the valve MP⁴, which water if not permitted to escape would oppose the pressure of the water flowing into the press through multiple valves MP and MP′.

Referring to Figure 7, the pipe 27′, which connects opening 27 of the multiple valve block to the press, is a pipe through which the high and low pressure fluid is applied to the press to close the same. The connecting pipe 60′, connecting the opening 60 of the valve block to the press, is a pipe thru which water flows to open the press. The pipes 61′ and 62′ connecting openings 61 and 62 to the mould block, which is raised up and down by the hydraulic press, are the pipes through which steam and cooling water are applied to the mould block to heat and cool the same as heretofore explained. Connecting pipes 56′ and 57′ are the pipes through which steam is supplied to the valve block and returned from the valve block. Connecting pipes 54′ and 55′ are the pipes through which the cooling water is led to and away from the valve block. Pipe 24′ which extends to the openings 24 and 53, is the pipe through which the high pressure water is connected to the valve block. Pipe 51′ is the low pressure entrance to the block and pipe 52′ a drain from the block.

While the press is only shown diagrammatically in Figure 7, such devices are well known in the art and thought to be sufficiently illustrated in this form.

From the above description of my invention it is evident that I have designed and associated a number of multiple valves and have also provided means for automatically opening and closing said multiple valves at different times, and for different periods of time to permit substances under pressure to flow through said multiple valves.

Having described my invention in connection with a hydraulic press, it is to be understood that I do not wish to be limited to this particular use, as my invention is adapted for other uses where substances under pressure are desired to be permitted to flow at different times and for different periods of time. Nor do I wish to be limited to the exact structure as shown and described, as modifications and changes may readily suggest themselves, but I aim to cover all that which comes within the scope and spirit of the appended claims.

Having described my invention what I claim as new and desire to secure by Letters Patent is:

1. In a device of the character described including a plurality of valves normally closed, said valves adapted to be seated by a substance under pressure, means associated with said valves for automatically opening said valves, said means being adjustable to determine the time of opening of said valves, said valves adapted to be closed when said first means are out of engagement with said valves, and a passage connecting two of said valves.

2. In a device of the character described including a number of valves normally closed, said valves adapted to be seated by a substance under pressure, automatically operated means associated with said valves for automatically opening said valves at different times and for different periods of time, and passages connecting certain of the valve chambers.

3. In a normally closed multiple valve of the class described including automatically controlled means for opening said valve, said valve adapted to be closed by a substance under pressure when said means no longer engages said valve, and manual means for opening said valve.

4. In a multiple valve of the character described including a valve seat and a valve ball for engaging said seat to close said valve, said valve ball adapted to be seated by a substance under pressure, means for automatically causing said valve ball to disengage said valve seat to open said valve, and manual means for causing said valve ball to disengage said valve seat.

5. A valve of the character described including a valve seat and a valve ball normally engaging said valve seat to prevent the passage of a substance through said valve, a member engaging said valve ball, automatically controlled means for automatically operating said member to cause said valve ball to disengage said valve seat to permit the passage of a substance through said valve, and manual means for operating said member.

6. In a valve of the character described including a valve seat and a valve ball, said ball valve adapted to be seated by a substance under pressure whereby said substance is prevented from flowing through said valve, means for automatically causing said ball to disengage said valve seat to permit said substance to flow through said valve, and manual means for causing said valve ball to disengage said valve seat.

7. In a device of the character described including a plurality of valves operatively associated to form a unit, substances under pressure, automatically controlled means associated with each of said valves for causing said valves to open at different times and for different periods of time to permit said substances to flow through said valves, and interconnecting passage between two of the valve chambers.

8. In a device of the class described including multiple valves normally closed, means individual to said valves for opening said valves, and a rotatable shaft having members secured thereto for engaging said means at different times and for different periods of time to operate said means to open said valves, and valves adapted to be closed when said members are not engaging said first means.

9. In a device of the class described including multiple valves having valve balls and cooperating valve seats, means individual to said valves for automatically opening the same, an electric motor operating means for automatically operating said means at different times and for different periods of time, thereby opening some of said valves while the remainder of said valves are closed, and interconnecting passage between valves.

10. In a device of the class described including a plurality of two position multiple valves, said valves adapted to be moved to one of their positions by a substance under pressure, individual means including slidable rods for moving said valves to their other positions, and motor driven means operatively associated with said individual means for automatically operating said individual means at different times and for different periods of time.

11. A device of the character described including a two position valve, automatic means for opening said valve, said valve adapted to be closed by a substance under pressure, a motor for operating said automatic means, and manual means for opening said valve.

12. A device of the character described including a valve, automatic means for opening said valve, a motor for operating said automatic means, a second valve associated automatic means for operating said second valve controlled by said motor, and a passage connecting said valves.

13. A device of the character described, a multiple valve unit, substances under pressure normally seating the valves of said unit and adapted to be controlled by said multiple valve unit, and electrically controlled automatic means for operating the said valves of said unit.

14. A device of the character described including a multiple valve unit having the individual valves normally seated by a substance under pressure, actuating means for individually operating the valves of said unit, said means being adjustable to determine the time of operation of the individual valves, and operating means for controlling said actuating means.

15. A device of the character described including a multiple valve unit, manual means for operating the valves of said unit, and automatically actuating means for individually operating the valves of said unit, operating means for controlling said actuating means, and adjusting means for each of said individual operating means.

16. A device of the character described including a valve unit comprising a plurality of individual valves, manual means for operating said valves, and automatically operating means including a cam for each of said valves, a shaft supporting said cams, and driving means for rotating said shaft.

17. A device of the character described including a plurality of associated individual valves, held in seated position by a substance under pressure, and operating cam for each of said valves, a shaft to which said cams are secured, adjusting means for said cams for regulating the normal positions of same, driving mechanism connected to said shaft, and electro-mechanical means for controlling said driving means.

18. A plural valve unit including a plunger for operating each valve, a rotatable shaft associatively connected to said valve unit, cams for said shaft for engaging and operating said valve plungers and electrical means for rotating said shaft and for stopping the rotation thereof.

19. A plural valve unit including a plunger for operating each valve, said valves adapted to be actuated in one direction by substances under pressure, a rotatable shaft associatively connected to said valve unit, cams for said shaft for engaging and operating said valve plungers to operate the valves in the opposite direction, and driving means for rotating said shaft.

20. A plural valve unit including a plunger for operating each valve, each valve adapted to be seated by a substance under pressure, a rotatable shaft associatively connected to said valve unit, cams for said shaft for engaging and operating said valve plungers thereby controlling the operation of said valves and the passage of said substances under pressure, driving means for rotating said shaft, and a device operated by the substances supplied it by said valves.

21. A device of the character described including a plurality of individually operated valves, said valve including a valve ball and the valve seat, and a slidably controlled plunger for each valve, a cam shaft, plates attached to said cam shaft, individual cams adjustably secured to said plates, a motor for rotating said cam shaft to cause said cams to operate said plungers and speed reducing means connecting said motor to said rotatable cam shaft.

22. A device of the character described, including a plurality of individually operated valves, each of said valves including a valve seat and a plunger controlled for cooperation with the valve seat, a cam shaft, plates attached to said cam shaft, individual cams adjustably secured to said plates, a motor for rotating said cam shaft to cause said cams to operate said valves, and speed reducing means connecting said motor to said rotatable cam shaft.

23. A device of the character described including a multiple valve device having individual valves for controlling the supply of a plurality of substances to a moulding machine, automatic means for operating said valves to properly supply said substances to said moulding machine, and adjustable means for said automatic means.

24. A device of the character described including a valve block containing a plurality of valves for controlling the application of a plurality of substances, the substances holding the valves in their normal positions, an operating member for each of said valves, a cam shaft provided with cams for actuating the different operating members, and a motor for actuating said cam shaft.

25. A device of the character described including a valve block containing a plurality of valves for controlling the application of a plurality of substances, an operating member for each of said valves, a cam shaft provided with cams for actuating the different operating members, a motor for actuating said cam shaft, and electrical means for automatically stopping the operation of said motor when said cam shaft has rotated a predetermined distance.

26. A device of the character described including a valve block containing a plurality of valves for controlling the application of a plurality of substances, operating members for said valves, a cam shaft provided with cams for actuating said different operating members, an electric motor for actuating said cam shaft, and means for automatically stopping the operation of said motor when said cam shaft has moved a predetermined distance, said cams being adjustable to operate at any desired time and to hold its associated valve open for any desired length of time.

27. A device of the character described including a valve block containing a plurality of valves, inlet and outlet ports for said valves extending into said valve block, and interconnecting ducts for certain of said valves.

28. A device of the character described including a valve block containing a plurality of valves, automatic means for actuating said valves, inlet and outlet ports extending into said valve block to said valves, and interconnecting ducts extending through said valve block connecting certain of the valves.

29. A device of the character described including a valve block containing a plurality of valves, an operating member for each of said valves, a cam shaft having individual cams for actuating said valve operating members, motor means for actuating said cam shaft, and manual means for individually controlling the operation of each of said valves.

30. A device of the character described including a valve block containing valve chambers, inlet and outlet ports into said valve block, and interconnecting ducts between some of the valve chambers.

31. A device of the character described including a valve block containing a plurality of valve chambers, inlet ports into said valve block, and interconnecting passages between valve chambers.

32. A device of the character described including a valve block having valve chambers, outlet ports extending from certain of the valve chambers, and interconnecting passages between certain of the valve chambers.

33. A device of the character described including a valve block having a plurality of individual valves, manual means for operating said valves, and automatic means for operating said valves.

34. A device of the character described including a valve block containing a plurality of valves, a plunger for each of said valves, a pivoted member for operating each of said plungers, and an adjustable rotatable cam for operating each of said pivoted members.

35. A device of the character described including a valve block containing a plurality of valve chambers, a valve ball in each of said chambers adapted to be seated by a substance under pressure, a plunger for contacting with the said valve ball, a pivoted member for operating said plunger, and a rotatable cam member for operating said pivoted member.

36. A device of the character described including a plurality of individual valve chambers, a valve member in each of said chambers adapted to be seated by a substance under pressure, a valve rod for operating the valves, pivoted members for operating said valve rods, and a plurality of rotatable cams for operating said pivoted members.

37. A device of the character described including a plurality of individual valve chambers, a valve member in each of said chambers adapted to be seated by a substance under pressure, a valve rod for operating the valves, pivoted members for operating said valve rods, a plurality of rotatable cams for operating said pivoted members, and passages connecting the valve chambers.

Signed by me at Chicago, in the county of Cook and State of Illinois, this 1st day of August, 1922.

HENRY GRIGOLEIT.